(12) United States Patent
Kim et al.

(10) Patent No.: US 9,760,191 B2
(45) Date of Patent: Sep. 12, 2017

(54) PLATE MEMBER FOR TOUCH PANEL AND METHOD OF MANUFACTURING THE SAME, AND TOUCH PANEL

(75) Inventors: Byung Soo Kim, Seoul (KR); Keun Sik Lee, Seoul (KR); Chung Won Seo, Seoul (KR); Ji Won Jo, Seoul (KR); Hyuk Jin Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 13/501,011

(22) PCT Filed: Oct. 7, 2010

(86) PCT No.: PCT/KR2010/006872
§ 371 (c)(1),
(2), (4) Date: Apr. 9, 2012

(87) PCT Pub. No.: WO2011/043612
PCT Pub. Date: Apr. 14, 2011

(65) Prior Publication Data
US 2012/0202027 A1    Aug. 9, 2012

(30) Foreign Application Priority Data
Oct. 8, 2009 (KR) .................. 10-2009-0095837

(51) Int. Cl.
*G06F 3/041* (2006.01)

(52) U.S. Cl.
CPC .... *G06F 3/041* (2013.01); *G06F 2203/04103* (2013.01); *Y10T 428/24942* (2015.01); *Y10T 428/31678* (2015.04)

(58) Field of Classification Search
CPC ........... G06F 3/041; G06F 2203/04103; Y10T 428/24942; Y10T 428/31678
USPC .................................. 428/212, 220
See application file for complete search history.

(56) References Cited

U.S. PATENT DOCUMENTS

| 5,952,084 | A  | * | 9/1999  | Anderson et al. | 428/212 |
| 6,380,480 | B1 |   | 4/2002  | Norimatsu et al. | |
| 6,839,108 | B1 | * | 1/2005  | Hirakata et al. | 349/114 |
| 7,483,212 | B2 |   | 1/2009  | Cho et al. | |
| 7,724,241 | B2 |   | 5/2010  | Fukui et al. | |
| 2005/0170158 | A1 | * | 8/2005 | Hattori et al. | 428/212 |
| 2007/0273973 | A1 |   | 11/2007 | Kursawe et al. | |
| 2008/0013177 | A1 |   | 1/2008  | Hatano et al. | |

FOREIGN PATENT DOCUMENTS

| CN | 10-1002114 A   | 7/2007  |
| EP | 1054455 A2     | 11/2000 |
| JP | 06-218864 A    | 8/1994  |
| JP | 11-085396 A    | 3/1999  |
| JP | 11-286066 A    | 10/1999 |
| JP | 2003-136625 A  | 5/2003  |
| JP | 2004-047456 A  | 2/2004  |
| JP | 2005-055899 A  | 3/2005  |
| JP | 2006-031590 A  | 2/2006  |
| JP | 2006-032256 A  | 2/2006  |
| JP | 2006-302562 A  | 11/2006 |
| KR | 10-2004-0028670 A | 4/2004 |
| KR | 10-2008-0070475 A | 7/2008 |

OTHER PUBLICATIONS

Kawazoe et al (JP 06-218864 machine translation), Aug. 9, 1994.*
Yanagimachi et al (JP 11-286066 machine translation), Oct. 19, 1999.*
Takamatsu et al (JP 11-085396 machine translation), Mar. 30, 1999.*
Office Action dated Jun. 25, 2013 in Japanese Application No. 2012-533085, filed Oct. 7, 2010.
Office Action dated Apr. 13, 2011 in Korean Application No. 10-2009-0095837, filed Oct. 8, 2009.
International Search Report in International Application No. PCT/KR2010/006872, filed Oct. 7, 2010.
Office Action dated Jun. 5, 2014 in Chinese Application No. 201080055905.9.

* cited by examiner

*Primary Examiner* — Aaron Austin
*Assistant Examiner* — Lawrence Ferguson
(74) *Attorney, Agent, or Firm* — Saliwanchik, Lloyd & Eisenschenk

(57) ABSTRACT

A plate member for touch panel and a method of manufacturing the same, and a touch panel are provided. The plate member for touch panel includes: a base substrate; an intermediate layer disposed on a first side of the base substrate; and a transparent conductive layer disposed on the intermediate layer.

6 Claims, 2 Drawing Sheets

[Fig. 1]
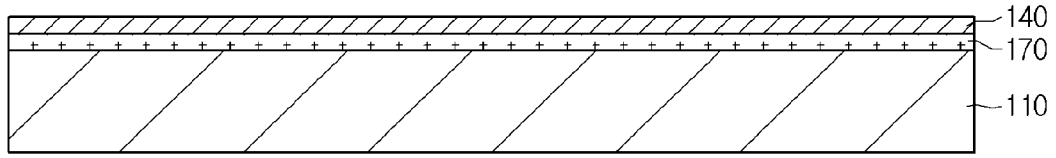
[Fig. 2]
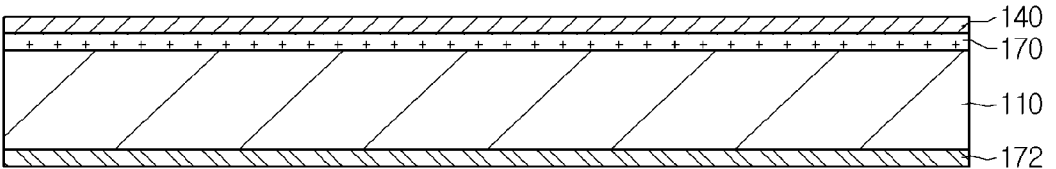
[Fig. 3]
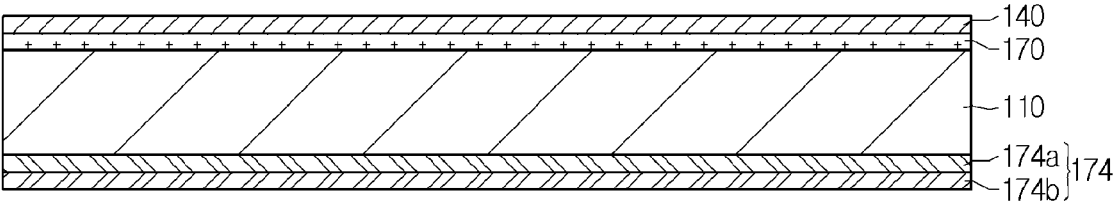
[Fig. 4]
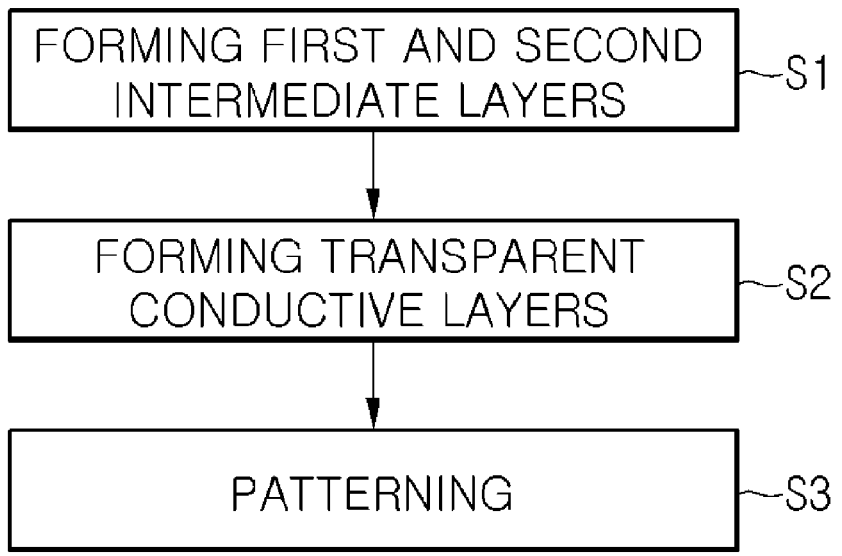

[Fig. 5]
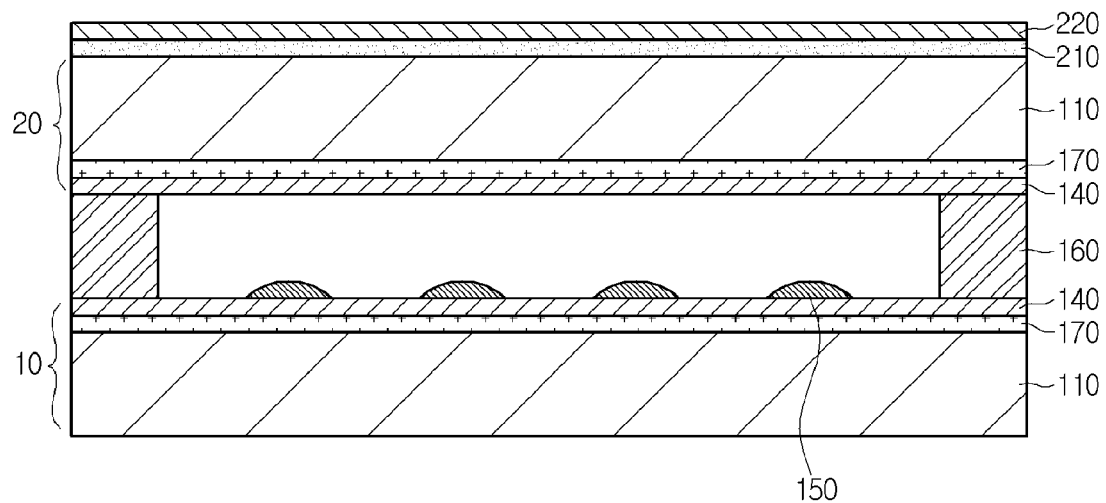
[Fig. 6]
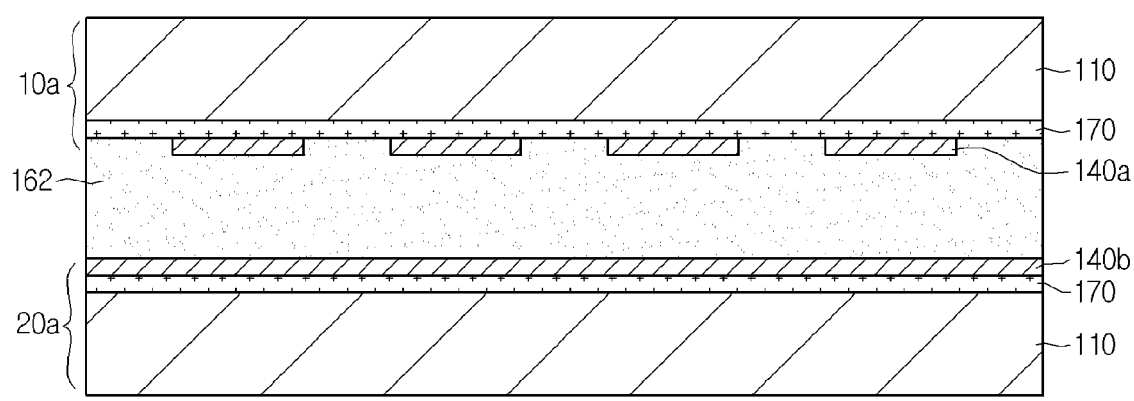

PLATE MEMBER FOR TOUCH PANEL AND METHOD OF MANUFACTURING THE SAME, AND TOUCH PANEL

CROSS-REFERENCE TO RELATED APPLICATIONS

This application is the U.S. national stage application of International Patent Application No. PCT/KR2010/006872, filed Oct. 7, 2010, which claims priority to Korean Application No. 10-2009-0095837, filed Oct. 8, 2009, the disclosures of each of which are incorporated herein by reference in their entirety.

TECHNICAL FIELD

The present disclosure relates to a plate member for touch panel and a method of manufacturing the same, and a touch panel.

BACKGROUND ART

In the latest diverse electronic products, a touch panel with an inputting method through which a finger or an input device such as a stylus is used to contact an image displayed on a display device is applied.

The touch panel may be divided into a touch panel of a resistive layer type and a touch panel of an electrostatic capacity type. In the touch panel of a resistive layer type, a position is detected when an electrode becomes a short circuit by pressure of an input device. In the touch panel of an electrostatic capacity type, a position is detected when an electrostatic capacity between electrodes is changed by finger contact.

In the touch panel, a transparent conductive layer for forming a touch electrode and a support substrate for supporting the transparent conductive layer are attached to each other by using an optically clear adhesive (OCA).

At this point, since processing of the OCA is complex, poor adhesion may occur and also, since a film and a substrate are stacked repeatedly, transmittance of the touch panel may be deteriorated.

DISCLOSURE OF INVENTION

Technical Problem

Embodiments provide a plate member reducing a usage amount of an optically clear adhesive (OCA), improving transmittance, and preventing a pattern of a transparent conductive layer from being visible from the external and a method of manufacturing the same, and a touch panel.

Solution to Problem

In one embodiment, a plate member for touch panel includes: a base substrate; an intermediate layer disposed on a first side of the base substrate; and a transparent conductive layer disposed on the intermediate layer.

A refractive index of the intermediate layer may be higher than that of the transparent conductive layer.

The plate member may further include at least one outer layer disposed on a second side of the base substrate.

As the outer layer becomes far from the base substrate, its refractive index may become lower.

The transparent conductive layer may include indium tin oxide (ITO).

The intermediate layer may include at least one of Mg, F, Si, Al, Ce, In, Hf, Zr, Pb, Ti, Ta, Nb and O.

In another embodiment, touch panel includes: a first plate member including a base substrate, an intermediate layer on a first side of the base substrate, and a transparent conductive layer on the intermediate layer; and a second plate member facing the first plate member.

A refractive index of the intermediate layer may be higher than that of the transparent conductive layer.

In further another embodiment, a method of manufacturing a plate member for touch panel includes: forming an intermediate layer on a base substrate; and forming a transparent conductive layer on the intermediate layer.

A refractive index of the intermediate layer may be higher than that of the transparent conductive layer.

The method may further include forming at least one outer layer on a second side of the base substrate.

As the outer layer becomes far from the base substrate, its refractive index may become lower.

The transparent conductive layer may include ITO.

The intermediate layer may include at least one of Mg, F, Si, Al, Ce, In, Hf, Zr, Pb, Ti, Ta, Nb and O.

The details of one or more embodiments are set forth in the accompanying drawings and the description below. Other features will be apparent from the description and drawings, and from the claims.

Advantageous Effects of Invention

According to the embodiments, the transmittance and the visibility of the plate member of the touch panel can be improved. Also, a pattern of a transparent conductive layer can be prevented from being visible from the external. In addition, the gas from the base substrate can be prevented from moving into the transparent conductive layer, so that reliability of the plate member is improved.

BRIEF DESCRIPTION OF DRAWINGS

FIG. 1 is a sectional view of a plate member for touch panel according to a first embodiment.

FIG. 2 is a sectional view illustrating a plate member for touch panel according to a second embodiment.

FIG. 3 is a sectional view of a plate member for touch panel according to a third embodiment.

FIG. 4 is a flowchart illustrating a method of manufacturing a plate member according to an embodiment.

FIG. 5 is a sectional view of a touch panel according to an embodiment.

FIG. 6 is a sectional view of a touch panel according to another embodiment.

BEST MODE FOR CARRYING OUT THE INVENTION

In the descriptions of embodiments, it will be understood that when a layer (or film), a region, a pattern, or a structure is referred to as being 'on/above' or 'below/under' a substrate, a layer, (or film), a region, or a pattern, it can be directly 'on/above' or 'below/under' the substrate, the layer (or film), the region, or the pattern, intervening layers may also be present. Reference about 'on/above' or 'below/under' of each layer will be described based on the accompanying drawings.

In the accompanying drawings, the thickness or size of each layer (or film), region, pattern or structure may be modified for clarity and convenience and thus does not entirely reflect an actual size thereof.

Hereinafter, embodiments will be described in detail with reference to the accompanying drawings.

FIG. 1 is a sectional view of a plate member for touch panel according to a first embodiment.

Referring to FIG. 1, the plate member for touch panel (hereinafter, referred to as a plate member) includes a base substrate 110, an intermediate layer 170 on the first side (hereinafter, referred to as the top surface) of the base substrate 110, and a transparent conductive layer 140 on the intermediate layer 170.

Here, the base substrate 110 is a plastic sheet or a plastic film and its material has a high transmittance of a visible ray (between 400 nm and 700 nm).

For example, the material may use Acrylic resin, Polycarbonate resin, Polyrthylene napthalate resin, Polyethylene terephthalate (PET) resin, Poly Propylene resin, Poly aryl resin, Polyether sulfone (PES) resin, PolyMethly Pentene resin, Poly Ether Ether Ketone resin, Polysulfone (PSF) resin, Acetic cellulose resin, Amorphous polyolefin resin, Polyethylene resin, Polyester resin, Epoxy resin, Polyamide resin, PAI resin, PPS resin, PEI resin, Olefin resin, Vinyl resin, and Fluorine resin.

For example, more than two types of those resins are processed using pneumatic press to form a plastic sheet or a plastic film. Additionally, at least two plastic sheets or plastic films formed of the above resin may be stacked or pressed. Additionally, a protective layer (not shown) of 5 to 100 formed of another resin may be disposed on the surface of a plastic sheet or a plastic film.

Moreover, the intermediate layer 170 on the base substrate 110 may have a higher refractive index than the transparent conductive layer 140 such as an indium-tin oxide (ITO) layer. Since the transparent conductive layer 140 and the base substrate 110 for supporting it are attached to each other by using the intermediate layer 170, a related art optically clear adhesive (OCA) used for attaching them to each other becomes unnecessary. Accordingly, processing deterioration due to a remaining component of the OCA may be prevented so that work effectiveness is increased. Moreover, transmittance and visibility reduction due to the OCA may be prevented and a touch panel may be thinly manufactured.

Moreover, the intermediate layer 170 prevents gas from the base substrate 110 from moving into the transparent conductive layer 140, so that reliability of the plate member is improved. Furthermore, since the intermediate layer 170 serves as a buffer layer between the base substrate 110 and the transparent conductive layer 140, a crack does not occur in the plate member after the forming of the transparent conductive layer 140. Thereby, durability of the plate member is improved.

At this point, by properly selecting materials of the intermediate layer 170, refractive index and transmittance may be adjusted. For example, the intermediate layer 170 may be formed of at least one of Mg, F, Si, Al, Ce, In, Hf, Zr, Pb, Ti, Ta, Nb, and O. The intermediate layer 170 may consist of $ZrO_2$, $Pb_5O_{11}$, $TiO_2$, $Ta_2O_5$, $Nb_2O_5$, $Al_2O_3$, $CeF_3$, SiO, $In_2O_3$, $HfO_2$, $MgF_2$, and $SiO_2$.

Here, the intermediate layer 170 may be adjusted to have refractive index and transmittance that a user wants within a range where a refractive index of the intermediate layer 170 is higher than that of the transparent conductive layer 140 thereon. As one example, the transparent conductive layer 140 is formed of ITO, and the intermediate layer 170 may be formed of $CeF_3$, SiO, $In_2O_3$, $HfO_2$, $ZrO_2$, $Pb_5O_{11}$, $TiO_2$, $Ta_2O_5$, and $Nb_2O_5$.

In case that the transparent conductive layer 140 is patterned in a wanted form by adjusting refractive index and transmittance, a pattern may be formed not to be visible from the external.

Hereinafter, with reference to FIGS. 2 and 3, a plate member according to another embodiment will be described in detail. Detailed description about the same or similar configuration of the first embodiment will be omitted, and only different parts will be described in more detail.

FIG. 2 is a sectional view illustrating a plate member for touch panel according to a second embodiment.

Referring to FIG. 2, compared to the first embodiment, the plate member further includes an outer layer 172 on the second side (hereinafter, referred to as the bottom surface) of the base substrate 110. At this point, by allowing a refractive index of the outer layer 172 to be higher than that of the transparent conductive layer 140, transmittance may be further improved.

At this point, similar to the intermediate layer 170, the outer layer 172 may be formed of at least one of Mg, F, Si, Al, Ce, In, Hf, Zr, Pb, Ti, Ta, Nb, and O. as one example, the outer layer 172 may be consist of $ZrO_2$, $Pb_5O_{11}$, $TiO_2$, $Ta_2O_5$, $Nb_2O_5$, $Al_2O_3$, $CeF_3$, SiO, $In_2O_3$, $HfO_2$, $MgF_2$, and $SiO_2$.

FIG. 3 is a sectional view of a plate member for touch panel according to a third embodiment.

Referring to FIG. 3, in relation to the plate member, an outer layer 174 on the bottom surface of a base substrate 110 includes a plurality of layers. That is, the outer layer 174 includes a first outer layer 174a on the bottom surface of the base substrate 110 and a second outer layer 174b on the first outer layer 174a.

At this point, a refractive index of the second outer layer 174b may be lower than that of the first outer layer 174a. Like this, reflectance may be reduced through optical interference phenomenon after the first outer layer 174a of a relatively high refractive index and the second outer layer 174b of a relatively low refractive index are stacked.

As one example, when ITO having a refractive index of 1.839 is used as the transparent conductive layer 140, $TiO_2$ having a refractive index of 2.35 is used as the intermediate layer 170, poly carbonate having a refractive index of 1.58 is used as the base substrate 110, $TiO_2$ having a refractive index of 2.35 is used as the first outer layer 174a, and $SiO_2$ having a refractive index of 1.4595 is used as the second outer layer 174b, a transmittance of 99.94447% is obtained at a reference wavelength of 555 nm. Here, the reason that the reference wavelength is set with 555 nm is that photopic luminous efficiency of a visible ray that human eyes recognize is the highest.

In the above descriptions and drawings, although the outer layer 174 is formed of two layers, the present invention is not limited thereto. Accordingly, when a plurality of outer layers 174 become far from the base substrate 110 and their refractive indices become smaller, this is also regarded as being in the scope of the present invention.

A method of manufacturing the plate member according to an embodiment will be described with reference to FIG. 4. Overlapping description will be omitted. FIG. 4 is a flowchart illustrating a method of manufacturing a plate member according to an embodiment.

First, an intermediate layer is formed on a base substrate in operation S1. Here, the base substrate may be the above mentioned plastic sheet or plastic film.

Next, a transparent conductive layer having smaller refractive index than the intermediate layer is stacked on the intermediate layer in operation S2. As one example, the transparent conductive layer may include ITO.

Next, the transparent conductive layer is exposed and developed for patterning in operation S3. Here, the patterning may be used in a multi resistive layer type or an electrostatic capacity type.

Then, at least one outer layer may be further formed on the second side of the base substrate.

Moreover, the plate member according to the embodiment may be applied to a touch panel of a resistive layer type and a touch panel of an electrostatic capacity type. As one example, the above-mentioned plate member (hereinafter, referred to as a first plate member) and an additional facing plate member (hereinafter, referred to as a second plate member) are attached to each other, thereby manufacturing a touch panel.

In more detail, as shown in FIG. 5, a spacer 150 is formed on a transparent layer 140 of the first plate member 10 and the second plate member 20 is attached to the first plate member 10 by using an adhesive layer 160, thereby constituting a touch panel of a resistive layer type. At this point, various materials are used for the adhesive layer 160 and for example, an OCA may be used as a transparent adhesive.

At this point, the first plate member 10 may be used as a bottom plate member and the second plate member 20 may be used as a top plate member. Then, a substrate or a film 220 with a logo may be positioned on the outer surface of the second plate member 20. This substrate or film 220 may be attached to the second plate member 20 by using an OCA layer 210.

Additionally, although it is shown that the second plate member 20 has the same structure as the first plate member 10, it may have a different structure. Moreover, although it is shown that the transparent conductive layer 140 of the first and second plate members 10 and 20 is not patterned, it may be patterned. Additionally, although the plate member of the first embodiment is used, it is apparent that another plate member may be used also.

Or, as shown in FIG. 6, a first plate member 10a and a second plate member 20a are attached to each other by using an adhesive layer 162, thereby constituting a touch panel of an electrostatic capacity type. The first plate member 10a includes a first sensing electrode 140a formed by patterning the transparent conductive layer 140 of FIGS. 1 to 3. The second plate member 20a includes a second sensing electrode 140b formed by patterning the transparent conductive layer 140 of FIGS. 1 to 3. At this point, according to an embodiment, the first plate member 10a may be used as a top plate member with a logo and the second plate member 20a may be used as a bottom plate member.

In the drawings, although it is shown that the second plate member 20a has the same structure as the first plate member 10a, it may have a different structure. In the drawings, although the plate member of the first embodiment is used as an example, it is apparent that a plate member of another embodiment may be used.

The touch panel may improve its optical characteristics by using the first plate member with excellent transmittance and visibility. Moreover, a compact and light touch panel may be realized by reducing a usage of an OCA layer, and also may improve transmittance and visibility furthermore.

Hereinafter, haze, transmittance, and yellowish b* of a resistive layer type touch panel using a plate member according to the embodiments 1 and 2 and the comparison example are measured and listed in Table 1 below. Additionally, optical characteristics of a bottom member plate in a resistive layer type touch panel using a plate member according to the embodiments 1 and 2 and the comparison example are measured and listed in Table 2 below.

In the touch panel according to the comparison example, a plate member, where a plastic film of a transparent conductive layer is attached to a substrate by using an OCA, is used for top and bottom plate members. In the embodiments 1 and 2, the first plate member according to an embodiment and the second plate member having the same structure as the first plate member are used for top and bottom plate members, respectively. In the embodiment 1, a thickness of the plate member is 0.8 mm and in the embodiment 2, a thickness of the plate member is 1 mm.

TABLE 1

| Classification | Mesurement item | Sample 1 | Sample 2 | Sample 3 | Average |
|---|---|---|---|---|---|
| Embodiment 1(0.8 T) | Haze | 1.20 | 1.13 | 1.32 | 1.21 |
| | Transmittance | 81.19 | 81.01 | 80.80 | 81.00 |
| | Yellowish (b*) | 3.74 | 3.20 | 3.03 | 3.32 |
| Embodiment 2(1.0 T) | Haze | 1.74 | 1.88 | 1.58 | 1.73 |
| | Transmittance | 79.55 | 80.17 | 79.98 | 79.90 |
| | Yellowish (b*) | 2.86 | 3.00 | 3.24 | 3.03 |
| Comparison example (1.4 T) | Haze | 3.76 | 3.70 | 3.75 | 3.74 |
| | Transmittance | 77.74 | 78.05 | 77.99 | 77.93 |
| | Yellowish (b*) | 6.14 | 6.06 | 6.14 | 6.11 |

Referring to Table 1, the respective average transmittances of 81.00 and 79.90 according to the embodiment 1 and the embodiment 2 are drastically improved compared to the average transmittance of 77.93 according to the comparison example. Additionally, haze and yellow according to embodiment 1 and embodiment 2 have smaller values compared to the comparison example and this shows improved visibility also.

TABLE 2

| Classification | Mesurement item | Sample 1 | Sample 2 | Sample 3 | Average |
|---|---|---|---|---|---|
| Embodiment 1(0.8 T) | Haze | 0.59 | 0.49 | 0.71 | 0.60 |
| | Transmittance | 90.41 | 90.37 | 90.17 | 90.32 |
| | Yellowish (b*) | 1.69 | 1.65 | 1.59 | 1.64 |
| Embodiment 2(1.0 T) | Haze | 0.94 | 1.54 | 1.44 | 1.31 |
| | Transmittance | 89.30 | 89.49 | 89.29 | 89.36 |
| | Yellowish (b*) | 1.63 | 1.53 | 1.51 | 1.56 |
| Comparison example (1.4 T) | Haze | 2.86 | 2.95 | 3.39 | 3.07 |
| | Transmittance | 86.53 | 86.69 | 86.71 | 86.68 |
| | Yellowish (b*) | 4.15 | 4.06 | 4.14 | 4.12 |

Referring to Table 2, it is apparent that transmittance and visibility of the plate member according to the embodiments 1 and 2 are improved like Table 1.

Any reference in this specification to one embodiment, an embodiment, example embodiment, etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A plate member for a touch panel, comprising:
   a base substrate;
   a protective layer on the base substrate;
   an intermediate layer disposed on a first side of the base substrate;
   a transparent conductive layer disposed on the intermediate layer; and
   an outer layer disposed on a second side of the base substrate,
   wherein a thickness of the protective layer is in a range of 5 µm to 100 µm,
   wherein the base substrate transmits light having a wavelength in a range of 550 nm to 700 nm,
   wherein the transparent conductive layer is in direct physical contact with the intermediate layer,
   wherein the intermediate layer is single layer,
   wherein the intermediate layer is formed of at least one of $ZrO_2$, $Pb_5O_{11}$, $Ta_2O_5$, $Nb_2O_5$, $Al_2O_3$, $CeF_3$, SiO, $In_2O_3$, $HfO_2$, $MgF_2$, and $SiO_2$;
   wherein the outer layer is formed of at least one of $ZrO_2$, $Pb_5O_{11}$, $TiO_2$, $Ta_2O_5$, $Nb_2O_5$, $Al_2O_3$, $CeF_3$, SiO, $In_2O_3$, $HfO_2$, $MgF_2$, and $SiO_2$;
   wherein the intermediate layer has a second refractive index (n2), the transparent conductive layer has a third refractive index (n3), and the outer layer has a fourth refractive index (n4); and
   wherein the second refractive index (n2), the third refractive index (n3), and the fourth refractive index (n4) satisfy both of the following conditions:
   n3<n2; and
   n3<n4.

2. The plate member according to claim 1, wherein the transparent conductive layer comprises indium tin oxide (ITO).

3. The plate member according to claim 1, wherein the outer layer comprises a first outer layer disposed on the second side of the base substrate and a second outer layer disposed on the first outer layer.

4. The plate member according to claim 3, wherein a refractive index of the second outer layer is lower than that of the first outer layer.

5. The plate member according to claim 3, wherein the first outer layer has a fifth refractive index (n5), and wherein the second refractive index (n2), the third refractive index (n3), and the fifth refractive index (n5) satisfy the following conditions:
   n3<n2; and
   n3<n5.

6. The plate member according to claim 1, wherein the fourth refractive index (n4) becomes lower as the outer layer gets farther away from the base substrate.

* * * * *